3,487,045
AROMATIC POLYMERS WHICH ARE PREPARED BY REACTING AN ORTHO PHENOLIC NOVOLAK WITH BORON COMPOUNDS
Alvin F. Shepard and Bobby F. Dannels, Grand Island, N.Y., assignors to Hooker Chemical Corporation, Niagara Falls, N.Y., a corporation of New York
No Drawing. Filed Nov. 30, 1964, Ser. No. 414,871
Int. Cl. C08g 33/18, 5/18
U.S. Cl. 260—50                                                6 Claims

ABSTRACT OF THE DISCLOSURE

Novel esters of boron and a phenol-aldehyde or phenol-ketone condensate are characterized in that: (1) a major proportion of the moiety of boron has the structure $$-O-B-O-$$
$$\phantom{-O-B}|$$
$$\phantom{-O-B-}X$$

in which the unsatisfied bonds are attached to aryl nuclei of the same phenolic condensate, and in which X is halogen, hydroxyl, hydrocarbyl, hydrocarbyloxy, halogen substituted hydrocarbyl, halogen-substituted hydrocarbyloxy, or an aryloxy radical of the same phenolic condensate to which the boron atom is attached; (2) at least 60 percent of the phenol-aldehyde or phenol-ketone condensate has o,o'-alkylidene linkages, and (3) the phenolic condensate has an average number or aryl nuclei per molecule in the range of 2.2 to 8.

The thermoplastic products of the invention can be modified to produce additional thermoplastic products such as reaction products with an oxyalkylation agent. Thermosetting products can be produced by curing the thermoplastic products of the invention with agents such as hexamethylene tetramine, or other donors of methylene radicals, or polyepoxides, or polyisocyanates, and the like. These thermoplastic and thermosetting products are used to produce shaped articles such as molded articles, laminates, protective coatings, including drying oil varnishes, abrasive structures, friction elements and the like, and can be used in the treatment of cellulosic materials.

---

This invention relates to novel aromatic polymers, and more particularly to novel polymers based on phenol-aldehyde or phenol-ketone condensates. The invention further relates to processes for the preparation of such products.

Phenol-aldehyde condensates are well known for use in molding compounds and many other applications requiring resinous products. For most purposes, the conventional phenol-aldehyde condensates meet the requirements of industry and commerce. However, the conventional phenol-aldehyde condensates show a high loss of weight when subjected to high temperatures for prolonged periods of time. While the fire resistance of the conventional phenol-aldehyde condensates is much better than the fire resistance of many polymeric materials, it is insufficient to satisfy the most stringent requirements encountered in present day commercial and industrial practice.

Accordingly, it is an object of the invention to provide novel polymeric products that have superior thermal stability, fire resistance and chemical resistance. It is a further object of the invention to provide novel aromatic polymers based on phenol-aldehyde and phenol-ketone condensates that have such improved properties. It is another object of the invention to provide polymeric products that exhibit low loss of weight on heating at elevated temperatures, and which further exhibit good hydrolytic stability. Another object of the invention is to provide novel processes for making such products. These and other objects of the invention will become apparent from a consideration of the following detailed specification.

In accordance with this invention, there are provided esters of boron and a phenol-aldehyde or phenol-ketone condensate, characterized in that:

(1) A major proportion of the moiety of boron has the formula $$-O-B-O-$$
$$\phantom{-O-B}|$$
$$\phantom{-O-B-}X$$

in which the unsatisfied bonds are attached to aryl nuclei of the same phenolic condensate, and X is halogen, hydroxyl, hydrocarbyl, hydrocarbyloxy, halogen-substituted hydrocarbyl, halogen-substituted hydrocarbyloxy, or an aryloxy radical of the same phenolic condensate to which the boron atom is attached;

(2) At least 60 percent of the phenol-aldehyde or phenol-ketone condensate has o,o'-alkylidene linkages; and (3) The phenolic condensate has an average number of aryl nuclei per molecule in the range of 2.2 to 8.

The preferred range is an average of 2.5 to 5 aryl nuclei per molecule.

In accordance with another aspect of the invention, the foregoing thermoplastic products of the invention can be modified to produce additional thermoplastic products or to produce thermosetting products. Thermoplastic modifications include reaction products with an oxyalkylation agent such as a mono oxirane ring compound, an alkylene halohydrin or an alkylene carbonate. Thermosetting products result from admixture of the thermoplastic products of the invention with such curing agents as hexamethylenetetramine, or other donors of methylene radicals; or polyepoxides; or polyisocyanates, and the like.

In other aspects of the invention the foregoing thermoplastic and thermosetting products are utilized to provide shaped articles, such as molded articles, laminates; protective coatings, including drying oil varnishes; abrasive structures; friction elements, and the like.

The phenolic condensates most useful in the practice of the invention are characterized by the following formula wherein:

$R_1$ is independently selected from the group consisting of hydrogen, fluorine, chlorine, bromine, and a hydrocarbon radical;

each of the substituents $R_2$ are independently selected from the group consisting of hydrogen, a hydrocarbon radical, and a halogen-substituted hydrocarbon radical; and n has an average value of about 0.2 to 6, preferably about 0.5 to 3.

Preferably, the phenolic condensates are novolacs, which contain more than one mole of the phenol per mole of the aldehyde or ketone. The condensates have at least 60 percent of o,o'-alkylidene linkages joining the phenol and aldehyde or ketone residues. In the specification and claims, the term "alkylidene" is used to express the structural relationship of the substituted methylene residues of the aldehyde or ketone to the phenolic nuclei of the phenolic condensates, and the term is intended to be generic to all such substituted methylene groups defined within the scope of the invention. Such condensates having a high percentage of o,o'-alkylidene linkage can be prepared by a process which comprises heating a mixture of a phenol in substantially anhydrous condition with an inorganic alkali catalyst to a temperature of at least 130 degrees centigrade, then introducing the aldehyde or ketone slowly into the preheated mixture and maintaining the resulting mixture at a temperature of at least 130 degrees centigrade until all the aldehyde or ketone has been introduced. The process can be conducted at atmospheric or at elevated pressure. Suitable catalysts are the inorganic alkali catalysts such as calcium hydroxide, barium hydroxide, strontium hydroxide, calcium carbonate, barium formate, magnesium hydroxide, zinc oxide, cadmium hydroxide, beryllium hydroxide, potassium hydroxide, sodium hydroxide, and the like. Only a small amount of catalyst is generally used, for example, in the range of 0.02 to 5 percent based on the weight of the phenol. It is generally convenient to slurry or dissolve the alkali catalyst in a small amount of water, and to introduce the resulting slurry or solution into the anhydrous phenol, thereafter raising the mixture of catalyst and phenol to the reaction temperature, thereby removing the water added with the alkali. Under the reaction conditions, the water of the condensation reaction continuously evaporates from the reaction mixture and is normally taken overhead through a distillation zone. The reaction temperature of at least 130 degrees centigrade and up to the boiling point of the phenol is generally maintained until all the aldehyde or ketone has been introduced, and substantially no more water escapes from the mixture at the reaction temperature. Thereafter, the temperature of the mixture can be elevated, if desired, to remove unreacted phenol. An alternative process for producing phenolic condensates having a high percentage of ortho linkage of the phenol and aldehyde or ketone residues involves utilizing a phenol that is substituted in the para-position in a conventional condensation process with an acid catalyst, such as sulfuric acid, hydrochloric acid or oxalic acid. Thereafter, the para-substituent can be removed from the ortho-linked condensate if a curable condensation product is desired. In the condensation processes, the ratio of the aldehyde or ketone to the phenol can be varied to prepare condensates of various molecular weights. Preferably, the ratio is in the range from about 0.5 to 1.0 mole of aldehyde or ketone to one mole of the phenol, preferably from 0.7 to 0.9 mole of aldehyde or ketone per mole of the phenol.

Suitable phenols for use in the preparation of the phenolic condensates have the following formula

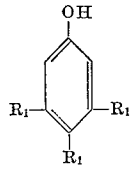

wherein each of the $R_1$ radicals is independently selected from the group consisting of hydrogen, halogen, hydroxyl, hydrocarbyl, hydrocarbyloxy, and hydroxyl-substituted hydrocarbyloxy. The halogen-substituents are preferably chlorine, fluorine, bromine, or mixtures thereof. The hydrocarbon radicals can be alkyl and alkenyl groups of 1 to 18 carbon atoms, preferably 1 to 6 carbon atoms; cycloalkyl groups of 5 to 18 carbon atoms, preferably 5 to 8 carbon atoms; and aryl groups of 6 to 18 carbon atoms, preferably 6 to 10 carbon atoms. Aryl is intended to include alkaryl and aralkyl. Suitable phenols are phenol, cresol, resorcinol, phloroglucinol, 3-methyl-5-ethyl phenol, meta-ethyl phenol, symmetrical xylenol, meta-isopropyl phenol, meta-isooctyl phenol, meta-phenyl phenol, meta-benzyl phenol, meta-cyclohexyl phenol, meta-cetyl phenol, meta-cumyl phenol; meta-methoxy phenol, 3,5-dimethoxy phenol; resorcinol that is mono-oxyalkylated with an alkylene oxide of 1 to 6 carbon atoms, such as ethylene oxide, propylene oxide, and the like; and phloroglucinol that is mono- or di-oxyalkylated with a similar alkylene oxide. The preferred phenols are generally para-unsubstituted as well as ortho-unsubstituted. However, such phenols can be used in admixture with para-substituted phenols such as para-cresol, para-isopropyl phenol, 3,4-dimethyl phenol, para-chloro phenol, para-fluoro phenol, para-bromo phenol, para-phenyl phenol, para-benzyl phenol, para-cyclohexyl phenol, hydroquinone, para-methoxy phenol; hydroquinone that is mono-oxyalkylated with an alkylene oxide such as ethylene oxide or propylene oxide; 3,4-dichloro phenol, 3,4-dimethoxy phenol, and the like.

The preferred aldehyde for preparing the phenolic condensate is formaldehyde, which can be in aqueous solution or in any of the low polymeric forms of paraformaldehyde. The aldehydes preferably contain 1 to 8 carbon atoms. Other examples include acetaldehyde, propionaldehyde, butyraldehhyde, chloracetaldehyde, 2-ethyl hexaldehyde, benzaldehyde, furfuraldehyde, ethyl butyraldehyde, pentaerythrose, chloral, and the like. The ketones useful in preparing the phenolic condensates have the formula

wherein each of the $R_2$ radicals represents an organic radical. The organic radicals are preferably hydrocarbon radicals of 1 to 7 carbon atoms. Examples of suitable ketones include acetone, methyl ethyl ketone, diethyl ketone, methyl benzyl ketone, methyl cyclohexyl ketone, diallyl ketone, as well as mixtures thereof.

The preferred compounds for reaction with the phenolic condensates are those having the following formula

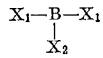

wherein:

each of the substituents $X_1$ is independently selected from the group consisting of halogen, hydroxyl, hydrocarbyloxy and halogen-substituted hydrocarbyloxy; and $X_2$ is selected from the group consisting of halogen, hydroxyl, hydrocarbyl, hydrocarbyloxy, halogen-substituted hydrocarbyl, and halogen-substituted hydrocarbyloxy.

Suitable hydrocarbon radicals include alkyl and alkenyl groups of 1 to 18 carbon atoms, preferably 1 to 6 carbon atoms; cycloalkyl groups of 5 to 18 carbon atoms, preferably 5 to 8 carbon atoms; aryl groups of 6 to 18 carbon atoms, preferably 6 to 10 carbon atoms, as well as halogen-substituted species, particularly chlorine and bromine substituted species, and hydroxyl-substituted species of the foregoing hydrocarbon radicals. Illustrative examples of the alkyl substituents are methyl, ethyl, propyl, octyl, dodecyl, stearyl, octadecyl, and the like, said alkyl group being a monovalent radical derivable from an aliphatic hydrocarbon by the removal of one hydrogen atom. The halogenated alkyl radicals include chloromethyl, bromoethyl, trifluoromethyl, chlorodecyl, and the like. Illustrative alkenyl substituents include vinyl, allyl, hexenyl, dodecenyl, and the like, said alkenyl group being a radical derivable from an alkene by the removal of one hydrogen atom. Halogen-substituted alkenyl radicals include trichloro vinyl, 2-chloroallyl, 2,3-difluorobutenyl, 2-bromoallyl, and the like. Suitable aryl substituents include phenyl, benzyl, tolyl, phenylethyl, xylyl, naphthyl hexylphenyl, and the like, said aryl proup being a monovalent radical derivable from an aromatic hydrocarbon by the removal of one hydrogen atom. The aryl radicals can be substituted by halogen, such as in p-chlorophenyl, p-bromophenyl, 2,4-dibromophenyl, p-fluorophenyl, and the like. Typical cycloalkyl substituents include cyclohexyl, cyclopentyl, cycloheptyl, cyclooctyl, and the like, said cycloalkyl group being a monovalent radical derivable from an alicyclic hydrocarbon by the removal of one hydrogen atom. Suitable halogen-substituted cycloalkyl radicals include chlorocyclohexyl, bromocyclopentyl, and fluorocyclohexyl, and the like.

Suitable boron compounds include ortho-boric acid, the monohydrocarbyl, dihydrocarbyl, and trihydrocarbyl ortho-borates, such as monomethylborate, monobutylborate, monophenylborate, monobenzylborate, monocyclohexylborate, dimethylborate, diphenylborate, trimethylborate, tributylborate, trilaurylborate, triphenylborate, tri(p-chlorophenyl) borate, tritolylborate, tribenzylborate, tricyclohexylborate, boron trichloride, boron tribromide, methyldichloroborate, butyldichloroborate propyldibromoborate, decyldichloroborate, phenyldichloroborate, p-chlorophenyldichloroborate, tolyldichloroborate, tri-tertiary-butylphenyl dichloroborate, cyclohexyldichloroborate, benzyldichloroborate, methyldichloroborane, methyldibromoborane, butyldichloroborane, octyldichloroborane, phenyldichloroborane, p - chlorophenyldichloroborane, cyclohexyldichloroborane, methylboronic acid, butylboronic acid, dicylboronic acid, phenylboronic acid, benzylboronic acid, dimethyl methylboronate, diethyl ethylboronate, diphenyl phenylboronate, dimethyl phenylboronate, dioctyl phenylboronate, dimethyl benzylboronate, dicyclohexyl methylboronate, and the like.

In the practice of this invention, mixtures of boron compounds can be employed in preparing the esterification products of the invention.

Various reaction conditions can be employed for the reaction of the phenolic condensate and the boron compound depending on the characteristics of the starting materials employed and the desired properties of the final products. Generally, the temperature of the reaction is in the range of 100 to 250 degrees centigrade, preferably in the range of 150 to 200 degrees centigrade. Atmospheric pressure is usually employed for the reaction, but superatmospheric pressure or vacuum conditions can be employed, if desired. Reaction time can vary from 0.5 to 15 hours. Various ratios of reactants can be employed depending on the characteristics of the reactants and desired final products. Generally, up to about 0.5 mole of the boron compound is employed in the reaction mixture per equivalent of phenolic nucleus in the phenolic condensate. The ratio of reactants is preferably within the range of about 0.05 to 0.33 mole of the boron compound per equivalent of phenolic nucleus in the phenolic condensate.

The polymeric esters of the invention generally have up to about 0.5 mole of boron compound incorporated in the composition per equivalent of phenolic nucleus in the phenolic condensate, preferably from about 0.05 to 0.33 mole per equivalent of phenolic nucleus. Generally, a major proportion, i.e., at least 50 percent, of the moiety of boron has the structure:

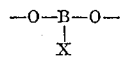

wherein the symbols have the meaning described hereinbefore, and in which the unsatisfied bonds are attached to aryl nuclei of the phenolic condensate. In the compositions of the invention, these unsatisfied bonds are predominantly attached to aryl nuclei of the same molecule of the phenolic condensate. Mixtures of esters are usually obtained.

The polymeric esters of the invention can be modified to produce additionally useful thermoplastic products by reaction of the free phenolic hydroxyl groups with additional reactants. Suitable for this purpose are various oxyalkylation agents such as compounds containing a mono oxirane ring. Monomeric epoxides having 2 to 18 carbon atoms are preferred, of which the alkylene oxides containing 2 to 6 carbon atoms are more preferred. Examples of suitable mono-epoxides are ethylene oxide, propylene oxide, cyclohexene oxide, styrene oxide, allyl glycidyl ether, epichlorohydrin, and the like. Catalysts for the reaction of the oxirane ring compounds with the phenolic hydroxyl groups of the compositions of the invention include the alkali or alkaline earth hydroxides, primary amines, secondary amines, tertiary amines, or basic alkali salts. Typical catalysts include sodium and calcium hydroxides, dimethyl, triethyl, and dimethyl benzyl amines, and salts of strong bases and weak acids such as sodium acetate or benzoate. The hydroxyalkylation reaction can be carried out at 0 to 200 degrees centigrade, preferably at 0 to 100 degrees. Other methods of hydroxyalkylation include reaction of the phenolic hydroxyl groups with alkylene halohydrins, such as ethylene chlorohydrin, propylene bromohydrin or glyceryl chlorohydrin in the presence of an alkali metal hydroxide of the type just described. Still another method of hydroxyalkylation includes reaction of the phenolic hydroxyl groups with alkylene carbonates, such as ethylene carbonate and propylene carbonate, using a catalyst such as sodium or potassium carbonate.

The thermoplastic compositions of the invention, including modifications thereof such as described in the preceding paragraph, can be converted to thermosetting compositions by admixture with a curing agent, such as a suitable donor of methylene radicals. Hexamethylene tetramine is preferably employed for this purpose, but formaldehyde and especially the polymeric forms thereof, such as paraform and trioxane, can also be employed. Such curing agents can be employed in a proportion in the range of 2 to 20 percent based on the weight of the boron ester. The thermosetting compositions can be converted to thermoset or cross-linked products by heating at elevated temperatures, for example, at about 300 to 500 degrees Fahrenheit, for periods of time ranging from a few minutes to one hour or more. Other suitable curing agents include polyepoxides, such as epoxidized soy bean oil, epoxidized cotton seed oil, epoxidized castor oil, epoxidized glycerol trioleate, epoxidized glycerol trilinoleate, epoxidized glycerol dioleate, epoxidized methyl linoleate, epoxidized ethyl linoleate, and the like.

The thermoplastic products of the invention, particularly the hydroxyalkylated products, can also be converted to cross-linked products by reaction with an organic polyisocyanate to produce polyurethane products. Suitable polyisocyanates inclue 2,4-tolylene diisocyanate, 2,6-tolylene diisocyanate, and mixtures thereof, and particularly the crude mixtures thereof that are commercially available. Other typical polyisocyanates include methylene-bis-(4-phenyl isocyanate), 1,3-cyclopentylene diisocyanate, 2,4,6-tolylene triisocyanate, and the like. Polyfunctional isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred are the polyaryl polyisocyanates, particularly polymethylene polyphenylisocyanate.

In preparing such polyurethane compositions, the components are preferably reacted in a ratio sufficient to provide about 85 to 115 percent of isocyanato groups with respect to the total number of hydroxyl groups present in the hydroxyl-containing polymeric material (and foaming agent, if one is provided). The reaction temperature generally ranges from about 20 to about 180 degrees centigrade, although higher and lower temperatures can be employed. Reaction catalysts can be employed, if desired. Suitable catalysts include the tertiary amines, such as triethylamine, and tetramethyl butane diamine. Also suitable are the morpholine compounds, such as N-methyl morpholine. When polyurethane foams are desired, foaming agents are incorporated in the reaction mixture. Foaming agents are generally those materials that are capable of liberating gaseous products when heated, or when reacted with an isocyanate. Preferably, foaming is accomplished by introducing a low boiling liquid into the reaction mixture, such as fluorochlorocarbon boiling in the range of −30 to 50 degrees centigrade. Typical foaming agents include trichlorofluoromethane, trichlorotrifluoroethane, difluoromonochloroethane, and difluorodichloroethane.

The compositions of the invention can be used in a wide variety of product applications. Thus, the thermoplastic compositions can be used in protective coatings of many varieties, for example, in drying oil varnishes. The thermosetting compositions can be compounded with various fillers, pigments, plasticizers, and other additives and used in the preparation of various molded articles of great utility. The compositions can be utilized with various reinforcing media, such as glass fibers, synthetic polymer fibers, asbestos, carbon fabric, fibrous aluminum oxide, and the like to provide laminated articles. The thermal stability of the compositions is particularly useful in such products as brake linings, clutch facings, grinding wheels, and abrasive paper and cloth. The compositions are also useful in basing cements and as foundry sand binders. The polyurethane compositions can be utilized for the preparation of foamed products, castings, coatings, and the like.

The boron compositions of the invention can be used for the treatment of cellulosic materials. The cellulosic materials useful in the invention are any of those derived from natural sources such as from wood, cotton and the like; as well as chemically treated varieties such as regenerated cellulose commonly known as rayon. It is generally preferred that the cellulosic material be consolidated in the form of a self-supporting sheet such as paper, or a woven or non-woven fabric. Paper is the preferred cellulosic material of the invention, and all types of paper, made by any of the well-known paper production processes, are contemplated. The boron composition is generally employed in an amount to provide 30 to 100 percent by weight based on the weight of the cellulosic material.

The cellulosic material to be treated is contacted with a solution of the esterification product of the invention in a suitable solvent, such as ketone, such as those described hereinbefore, or a halocarbon, such as carbon tetrachloride, chloroform, methylchloroform, dichloroethylene, trichloroethylene, ethyl dibromide, propylene dibromide, and the like. Generally, the solvents have a boiling point less than 150 degrees centigrade. The contacting step may be carried out in a variety of ways. For example, the cellulosic material can be immersed in a tank containing the solution for a suitable period of time in a batchwise manner, or can be continuously passed through such a tank by means of rollers which facilitate the passage of a cellulosic sheet such as paper. The composition can also be applied to cellulosic material by spraying, or by passing a sheet of the material through rollers that have been wetted with the solution. The boron ester composition can be added to the beater in a paper-making process. The temperature of the process can be varied over wide limits, but is preferably at room temperature, or about 30° C. When the cellulosic material has been treated with the solution, the excess solution is drained or squeezed out, and the treated cellulosic material is dried at a temperature up to 150° C. Generally, a suitable curing agent, such as hexamethylene tetramine, is included in the treating solution. Then the dried, treated cellulosic material can be subjected to curing conditions to cure the boron ester composition by the methods disclosed herein.

The following examples illustrate the various aspects of the invention, but are not intended to limit the invention. Unless specified otherwise, temperatures are given in degrees centigrade and parts by weight.

EXAMPLE 1

500 parts by weight of anhydrous phenol were heated to 80 degrees centigrade, and mixed with a slurry of 0.9 part of calcium hydroxide in 25 parts of water in a reactor provided with a condenser and in communication with the atmosphere. The mixture was elevated to a temperature of 160 degrees centigrade to remove the added water and provide a substantially anhydrous mixture. While maintaining the temperature at 160 degrees centigrade, 81 parts by weight of a 37 weight percent aqueous solution of formaldehyde was introduced portionwise beneath the surface of the phenol over a period of two hours. During the reaction, distillate was taken overhead from the reaction mixture. The distillate contained chiefly water with a few percent of formaldehyde and phenol. The reaction temperature was maintained at about 160 degrees centigrade until substantially all the water had been removed from the reaction mixture, and thereafter the temperature was elevated to about 200 degrees centigrade to remove unreacted phenol. The product of the process was analyzed and found to contain about 95 percent of material containing o,o'-alkylidene linkage, about 3 percent of material containing o,p'-alkylidene linkage, and about 2 percent of material having p,p'-alkylidene linkage.

EXAMPLE 2

Into a stirred reactor equipped for distillation, there were placed 300 parts of a high ortho phenol-formaldehyde novolac having about 95 percent of o,o'-alkylidene linkages and an average molecular weight of 450, and 31 parts by weight of boric acid. The temperature was slowly increased. At 140° C., distillate started to collect. After 1.25 hours, the temperature of the reaction mixture was 210° C., and 48 parts of distillate were collected. The distillate was a mixture of water and phenol. The product was then poured into a container and allowed to harden. It was a hard, brittle non-sticky resin. Analysis showed the product to contain 1.9% B. A major proportion of the boron was chemically combined in the product in the form of the cyclic structure wherein two bonds of the boron atom are joined to phenoxy radicals of the same molecule of phenolic condensate. A pulverized sample was stirred in water at room temperature, for 1 hour. Mannitol was then added and the mixture titrated with 1 normal NaOH. No acidity was detected, indicating good hydrolytic stability. The pulverized product, when admixed with about 10 percent of hexamethylene tetramine, readily cured to a hard infusible resin upon heating to 160° C.

EXAMPLE 3

To test the thermal stability of the product, samples of carefully desiccated cured resin of 100–400 micron size were placed in No. 1 Coors porcelain crucibles and covered with a crucible cover. The crucibles were then placed on a holding tray and baked in an air circulating oven at 400±5° C. for 4 hours. At the end of this time, the crucibles were removed to a desiccator, cooled, re-weighed, and the percent weight loss calculated. Results were as follows:

Type resin: Weight loss, percent
    Novolac containing about 10% o,o'-alkylidene linkages _____ 80–95
    Product of Example 2 _____ 38

EXAMPLES 4 TO 9

The procedure of Example 2 is repeated with high ortho content phenolic condensates based on other carbonyl compounds and phenols to produce useful products of the invention:

| Example No. | Carbonyl compound | Phenol |
|---|---|---|
| 4 | Formaldehyde | Meta-cresol. |
| 5 | do | 3-methyl-5-ethyl phenol. |
| 6 | do | Isopropyl phenol. |
| 7 | Acetaldehyde | Phenol. |
| 8 | Benzaldehyde | Do. |
| 9 | Crotonaldehyde | p-Chlorophenol. |

EXAMPLE 10

Into a stirred reactor, there were placed 184 parts by weight of a high ortho novolac having about 95% o,o'-alkylidene linkages and an average molecular weight of 380. The free phenol and traces of water present were removed by distillation under vacuum. Then 68 parts by weight of 2,6-di-t-butylphenoxy dichloroborane were then added slowly over 2.4 hours at a reaction temperature of 180–220° C. After an additional one hour at 220° C., the HCl evolution had stopped. The product was then poured into a container and allowed to harden. Analysis showed the product to contain 1.29% B. The product was readily curable with hexamethylene tetramine.

EXAMPLE 11

Into a stirred reactor, then were placed 965 parts of a high ortho novolac having about 95% o,o'-alkylidene linkages and an average molecular weight of 430 and which had been freed from moisture and phenol by vacuum distillation. This was heated to 180° C., and 754 parts of 4 - methyl - 2,6-di-t-butylphenyl-dibutylborate were added. Provision was made to distill off volatile material as soon as it was formed. The temperature of the reaction mixture was then increased to 250° C. at such a rate that the vapor temperature of the distillate remained in the range 117–120° C. This portion of the process required five hours. A total 252 parts of butanol distillate was collected. The product was then poured into a container, and allowed to harden into a clear, light yellow, brittle solid. Analysis showed the product to contain 1.5% B. The product was readily curable with hexamethylane tetramine.

EXAMPLE 12

Into a stirred reactor, there were placed 150 parts of a high ortho novolac containing about 70% of o,o'-alkylidene linkages, and which was essentially free of phenol, and 16 parts of boric acid. Volatile material was distilled off as soon as it formed. Reaction started at a temperature of about 145° C. The temperature was then increased at such a rate that the vapor temperature of the distillate was 98–104° C. After 30 minutes, the reaction temperature was 200° C. and eleven parts of distillate had been removed. The distillate was essentially all water. The product was then poured into a receptacle and allowed to harden into a brittle resin. Analysis showed it to contain 1.8% B. The product was readily curable with hexamethylene tetramine.

EXAMPLE 13

Into a stirred reactor, there were placed 300 parts of a low ortho novolac containing about 10 percent o,o'-alkylidene linkages, and 5 parts of $H_3BO_3$. The mixture was heated from 160 to 200° C. during a one hour period, and volatile material was removed as it formed. The viscosity of the reaction mixture increased, but it remained stirrable. An additional 5 parts of $H_3BO_3$ were added and the reaction continued. After 10 minutes, the mixture was too viscous to stir and the product was dumped into a container and allowed to harden. Seven parts of volatile material had been removed from the reactor. The product contained 0.7% B.

EXAMPLE 14

The thermal stability of the compositions of the invention was determined by Isothermal Gravametric Analysis using a cured specimen prepared in accordance with Example 2 and containing 1.7 weight percent boron. A cured specimen of product prepared in accordance with Example 13 was also tested for the purpose of comparison. The latter material was prepared so that it contained the maximum amount of boron that could be incorporated without causing gelation of the material. The boron content of the control was 0.7 percent. In the test procedure, the samples were ground to 40–140 mesh particle size, and exposed to air in an oven. This oven was equipped with a Cahn RG electrobalance and an automatic recorder for continuously recording the weight of the samples. The oven was rapidly heated to 330 degrees centigrade and held at that temperature for 0.5 hour. This initial heating period served to remove volatile material from the samples, and very little weight loss was observed above 250 degrees. Then the oven was rapidly heated to 410 degrees and maintained at that temperature for 40 minutes. The weight loss in this latter heating period was observed and recorded as the weight loss between 250° C. and 40 minutes at 410 degrees. The rate of weight loss at 410 degrees was determined by measuring the slope of the plot of weight versus time provided by the automatic recorder.

The results of the foregoing test are as follows:

| | Rate of Loss in Weight, percent/ minute | Weight Loss after 40 minutes at 410° C., less initial loss |
|---|---|---|
| Product from High Ortho Novolac | 0.23 | 11.4 |
| Product from Low Ortho Novolac | 0.54 | 25.4 |

The product of the invention exhibited far greater thermal stability than did the product made with a conventional novolac.

In the foregoing specification, the o,o'-alkylidene content of the phenolic condensate is determined by reacting the phenolic condensate with trimethylchlorosilane to react all the phenolic hydroxyl groups. The resulting composition is fractionated by vapor phase chromatography, and the proportion of the o,o'-isomer is determined.

While this invention has been described with reference to certain specific embodiments, it will be recognized by those skilled in the art that many variations are possible without departing from the spirit and scope of the invention.

We claim:
1. An ester of components consisting essentially of boron and a phenolic composition having the following formula

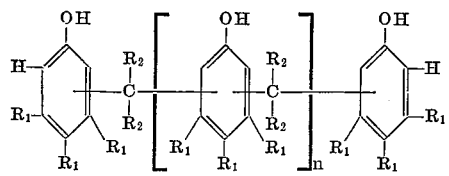

wherein $R_1$ is independently selected from the group consisting of hydrogen, fluorine, chlorine, bromine, and a hydrocarbon radical; each of the substituents $R_2$ are independently selected from the group consisting of hydrogen, a hydrocarbon radical, and a halogen-substituted hydrocarbon radical; and $n$ has an average value of about 0.2 to 6, characterized in that:
  (1) a major proportion of the moiety of boron has the formula:

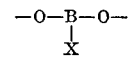

in which the unsatisfied bonds are attached to nuclei of the same molecule of phenolic composition, and wherein: X is selected from the group consisting of halogen, hydroxyl, hydrocarbyl, hydrocarbyloxy, halogen-substituted hydrocarbyl, halogen-substituted hydrocarbyloxy, and an aryloxy radical of the same molecule of phenolic composition to which the boron atom is attached;

(2) at least 60 percent of the phenolic composition has o,o'-alkylidene linkages.

2. An ester of components consisting essentially of boron and a phenolic composition having the formula

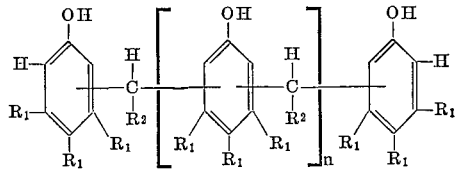

wherein $R_1$ is independently selected from the group consisting of hydrogen, fluorine, chlorine, bromine, and a hydrocarbon radical; each of the substituents $R_2$ are independently selected from the group consisting of hydrogen, a hydrocarbon radical, and a halogen-substituted hydrocarbon radical; and $n$ has an average value of about 0.2 to 6, characterized in that:

(1) a major proportion of the moiety of boron has the formula:

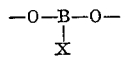

in which the unsatisfied bonds are attached to nuclei of the same molecule of phenolic composition, and wherein: X is selected from the group consisting of halogen, hydroxyl, hydrocarbyl, hydrocarbyloxy, halogen-substituted hydrocarbyl, halogen-substituted hydrocarbyloxy, and an aryloxy radical of the same molecule of phenolic composition to which the boron atom is attached;

(2) at least 60 percent of the phenolic composition has o,o'-alkylidene linkages.

3. The ester of claim 2 wherein $R_1$ and $R_2$ are hydrogen and $n$ has an average value of about 0.5 to 3.

4. The ester of claim 3 wherein X is hydroxyl.

5. A mixture comprising (a) hexamethylene tetramine and (b) an ester according to claim 1.

6. A cured product of (a) hexamethylene tetramine and (b) an ester according to claim 1.

References Cited

UNITED STATES PATENTS

| | | | |
|---|---|---|---|
| 1,678,107 | 7/1928 | Deutsch et al. | 260—57 |
| 2,475,587 | 7/1949 | Bender et al. | 260—57 |
| 2,606,887 | 8/1952 | Pearce | 260—54 |
| 2,606,888 | 8/1952 | Williams et al. | 260—59 |
| 2,606,889 | 8/1952 | Ward et al. | 260—59 |
| 2,667,466 | 1/1954 | Nagy | 260—51 |
| 2,715,114 | 8/1955 | Huck | 260—57 |
| 2,855,382 | 10/1958 | Mitchell | 260—57 |
| 3,006,893 | 10/1961 | West et al. | 260—57 |
| 3,050,797 | 8/1962 | Freedman et al. | 22—193 |
| 3,106,547 | 10/1963 | McTaggart et al. | 260—57 |
| 3,108,978 | 10/1963 | McNaughtan | 260—19 |
| 3,326,843 | 6/1967 | Barnett et al. | 260—38 |
| 3,332,911 | 7/1967 | Huck | 260—57 |

OTHER REFERENCES

J. of Applied Chemistry, Fraser et al. (1957), pp. 676–690.

HAROLD ANDERSON, Primary Examiner

H. SCHAIN, Assistant Examiner

U.S. Cl. X.R.

117—155, 161; 161—198, 205, 215; 162—165; 260—2.5, 19, 33.2, 33.6, 51, 53, 57, 59